E. ZAHM.
METHOD OF TESTING FILTER BODIES.
APPLICATION FILED OCT. 21, 1912. RENEWED JAN. 26, 1917.
1,218,154.  Patented Mar. 6, 1917.
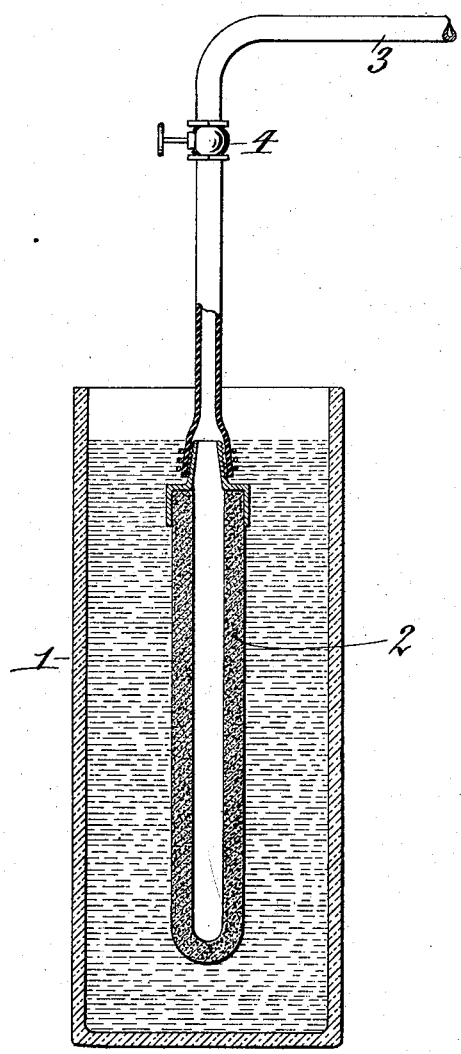

UNITED STATES PATENT OFFICE.

EDWARD ZAHM, OF BUFFALO, NEW YORK, ASSIGNOR TO ZAHM MANUFACTURING COMPANY, OF BUFFALO, NEW YORK, A CORPORATION OF NEW YORK.

METHOD OF TESTING FILTER-BODIES.

1,218,154.

Specification of Letters Patent.

Patented Mar. 6, 1917.

Application filed October 21, 1912, Serial No. 726,882. Renewed January 26, 1917. Serial No. 144,765.

*To all whom it may concern:*

Be it known that I, EDWARD ZAHM, a citizen of the United States, residing at Buffalo, in the county of Erie and State of New York, have invented new and useful Improvements in Methods of Testing Filter-Bodies, of which the following is a specification.

This invention relates to a method of testing filtering bodies which are employed more particularly for removing from liquids yeast cells or other micro-organisms so that the liquid will not ferment when stored for a considerable length of time, said test being intended for determining whether the filter bodies contain any crack or unduly large pores which would permit the passage of such micro-organism and thus enable imperfect filter bodies to be detected and discarded.

In the operation of a filter designed to separate from a liquid any micro-organism such as yeast and the like from beer it is essential that all such organisms shall be removed from the liquid passing through the filtering body in order to prevent fermentation or other deleterious action due to micro-organisms in the filtrate after filtration.

If the pores or interstices of the filter body are sufficiently large to permit the passage of micro-organisms the function of the filter is destroyed inasmuch as the same is ineffective in accomplishing the purpose which it is desired to attain.

It is the object of this invention to provide a simple, efficient, inexpensive and convenient method for testing filter bodies preparatory to using the same for filtration for determining whether the pores or interstices thereof are sufficiently minute to properly separate the micro-organisms from the filtrate.

It has been found that the efficiency of a filter body, so far as the removal of micro-organisms is concerned, is dependent upon the minuteness of the pores or interstices of the filter body. It has also been found that a filter body which will effectively separate or remove yeast and other micro-organisms from the filtrate will permit liquid to pass through the same at a comparatively low pressure, while gas or air under the same pressure would not pass through the pores or interstices of the filtering body if the latter is saturated with water. As the minuteness of the pores or interstices in the composition of the filter body increases, the same, when wetted will resist the passage of gas or air under a correspondingly increased pressure.

For the purpose of utilizing the principle in testing a filter body the latter is first wetted thoroughly with water or other suitable liquid so as to fill its pores or interstices with liquid, then a gas such as air or carbonic acid gas is directed under a pressure greater than atmospheric pressure against one side of the filter body and at the same time the action of this gas pressure is observed on the opposite side of the filter body. If no gas or air escapes on that side of the body opposite to which the gas at the predetermined testing pressure is applied this demonstrates that the interstices or pores of the filter body are sufficiently fine to prevent the passage of those micro-organisms through the filter body for which the test is made. In like manner the filter body may be tested as to its filtering efficiency at any other pressure depending on the particular use for which the filter is intended.

The accompanying drawing illustrates means for practising the method embodying this invention.

In this drawing, 1 represents a tank which for convenience of observation is preferably constructed of glass and which is filled with water or other suitable liquid. 2 represents a filter body which in this instance has the form of a cylinder having one end closed and the other end open. This filter body may be constructed of any suitable material such as infusorial earth which provides minute pores or interstices in the filter body. 3 represents a tube which is connected at one end with the open end of the filter cylinder while its other end is connected with means for supplying air or gas under a pressure greater than atmospheric pressure. 4 is a valve in the pressure pipe for controlling the supply of gas.

Preparatory to testing the filter cylinder or body the same is thoroughly wetted and then placed in the water of the tank so that the same is completely submerged, as shown in the drawings and then compressed air or the like is admitted to the inner side of the cylinder by opening the valve 4 in the supply pipe whereby a pressure of this air is produced on the interior of the cylinder. If now upon observing the exterior of the filter cylinder no bubbles of air are visible this is evidence that the pores or interstices of the filter cylinder are sufficiently minute to prevent the passage through the same of micro-organisms of a certain degree of fineness.

If, however, bubbles of air are detected on the exterior of the filter body while the latter is subjected to the predetermined internal gas pressure it is evidence that the pores or interstices are not sufficiently minute to remove micro-organisms of a certain degree of fineness, and this cylinder will therefore be discarded.

The resistance to the passage of air through the pores of the filter body is due to presence of water in these pores and the extent of this resistance is governed by the size of the pores and the amount of pressure behind the gas.

In actual practice it has been demonstrated that some filter cylinders when wetted will withstand a pressure as great as one atmosphere without permitting any gas to pass through the same.

Such high pressure is however not necessary when testing filter bodies which are intended to remove yeast and other micro-organisms found in beer as the removal of such organisms in beer can usually be effected by filtering bodies which are capable when wetted of withstanding a gas pressure of one-third of an atmosphere.

Should the filtering body be required for removing finer micro-organisms or other suspended bodies which will pass through the pores of the body when tested only under a gas pressure of one-third atmosphere, a higher pressure may be used for such higher test. In like manner when larger organisms, such as yeast alone are to be removed from a liquid, a test under a gas or air pressure above atmospheric but below one-third atmosphere may be used.

I claim as my invention:

The hereindescribed method of testing a porous filter body for determining the size of the pores therein comprising wetting said body so that the interstices are liquid sealed and then subjecting the same to gas pressure and determining the pressure at which the seal is broken.

Witness my hand this 14th day of October, 1912.

EDWARD ZAHM.

Witnesses:
 THEO. L. POPP,
 E. M. GRAHAM.

Copies of this patent may be obtained for five cents each, by addressing the "Commissioner of Patents, Washington, D. C."